US011904695B2

United States Patent
Binder et al.

(10) Patent No.: US 11,904,695 B2
(45) Date of Patent: Feb. 20, 2024

(54) INTEGRATED TORQUE CONVERTER AND P2 MODULE

(71) Applicants: Exedy Globalparts Corporation, Belleville, MI (US); BorgWarner Inc., Auburn Hills, MI (US)

(72) Inventors: Scott William Binder, South Lyon, MI (US); Calahan B. Campton, Royal Oak, MI (US); Michael W. Campbell, Royal Oak, MI (US)

(73) Assignees: Exedy Globalparts Corporation, Belleville, MI (US); BorgWarner Inc., Auburn Hills, MI (US)

( * ) Notice: Subject to any disclaimer, the term of this patent is extended or adjusted under 35 U.S.C. 154(b) by 122 days.

(21) Appl. No.: 17/609,567

(22) PCT Filed: May 25, 2020

(86) PCT No.: PCT/US2020/034452
§ 371 (c)(1),
(2) Date: Nov. 8, 2021

(87) PCT Pub. No.: WO2020/243041
PCT Pub. Date: Dec. 3, 2020

(65) Prior Publication Data
US 2022/0219524 A1   Jul. 14, 2022

Related U.S. Application Data

(60) Provisional application No. 62/852,403, filed on May 24, 2019.

(51) Int. Cl.
*B60K 6/40* (2007.10)
*F16H 45/02* (2006.01)
(Continued)

(52) U.S. Cl.
CPC ............... *B60K 6/40* (2013.01); *B60K 6/387* (2013.01); *F16H 45/02* (2013.01);
(Continued)

(58) Field of Classification Search
CPC .............. F16D 33/18; F16D 45/00–2045/0294
See application file for complete search history.

(56) References Cited

U.S. PATENT DOCUMENTS 10,293,674 B1   5/2019   Wilton
10,352,422 B2   7/2019   Satyaseelan et al.
(Continued)

FOREIGN PATENT DOCUMENTS

WO   WO-2018151801 A1 *   8/2018

OTHER PUBLICATIONS

International Search Report for Application No. PCT/US2020/034452 dated Oct. 10, 2020, 2 pages.

*Primary Examiner* — Ernesto A Suarez
*Assistant Examiner* — Lillian T Nguyen
(74) *Attorney, Agent, or Firm* — Howard & Howard Attorneys PLLC (57) ABSTRACT

An assembly for power transmission between an output of a drive engine and an input of a transmission. The assembly includes a torque converter and a P2 module that are axially engage and retained for flexibility in assembling of the assembly. The P2 module including a clutch and an electric motor.

20 Claims, 5 Drawing Sheets

(51) Int. Cl.
*B60K 6/387* (2007.10)
*B60K 6/48* (2007.10)
*F16H 45/00* (2006.01)

(52) U.S. Cl.
CPC ... *B60K 2006/4825* (2013.01); *B60Y 2200/92* (2013.01); *F16H 2045/002* (2013.01)

(56) References Cited

U.S. PATENT DOCUMENTS

| | | | |
|---|---|---|---|
| 2005/0150734 A1* | 7/2005 | Breier | B60K 6/405 |
| | | | 903/952 |
| 2008/0023287 A1 | 1/2008 | Thiede et al. | |
| 2008/0072586 A1* | 3/2008 | Hammond | B60K 6/485 |
| | | | 60/330 |
| 2014/0124318 A1* | 5/2014 | Frait | B21K 1/762 |
| | | | 29/428 |
| 2016/0105060 A1 | 4/2016 | Lindemann et al. | |
| 2019/0044410 A1* | 2/2019 | Vanni | B60K 6/40 |
| 2019/0273410 A1 | 9/2019 | Satyaseelan | |
| 2020/0040974 A1 | 2/2020 | Payne et al. | |
| 2020/0094668 A1* | 3/2020 | Podschwadt | B60K 6/405 |

* cited by examiner

INTEGRATED TORQUE CONVERTER AND P2 MODULE

CROSS REFERENCE TO RELATED APPLICATIONS

The present application is the National Stage of International Patent Application No. PCT/US2020/034452, filed May 25, 2020, which claims priority to and all the benefits of U.S. Provisional Application No. 62/852,403, filed May 24, 2019, the entire contents of which are herein incorporated by reference.

BACKGROUND

Field of the Invention

The present invention generally relates to powertrains for motor vehicles and, more particularly, to a hybrid powertrain for a motor vehicle.

Description of Related Art

Today, the automotive industry is increasingly moving away from combustion engine vehicles and toward electric vehicles. One drawback of an all-electric vehicle (EV), however, is the current limitation on battery technology and, resultantly, the mileage range of the vehicle. While drivers who only have short range needs do not consider this a inconvenience, drivers who at least occasionally have mileage needs beyond the typical range of an all-electric vehicle must generally choose between stopping for extended periods of time to recharge the battery or owning a second vehicle for extended mileage range driving.

There is a bridge, however, between these two choices, hybrid vehicles (HV) and plug-in hybrid vehicles (PHEV). Plug-in hybrid vehicles first run on electricity, but utilize a gas engine backup to extend the range of the vehicle. Hybrid vehicles alternate between use of a combustion and an electric motor for higher mileage.

After vehicles with gas or diesel powertrains, consumers next, and increasingly, prefer vehicles with hybrid powertrains.

Various drivetrain architectures exist for hybrid vehicles and are known as P1, P2, P3 and P4 configurations. In a P1 configuration, the electric motor is connected to the combustion engine and located after the combustion engine. A P2 configuration locates the electric motor between the combustion engine and the transmission and allows for the combustion engine to be disconnected from the transmission. A P3 configuration locates the electric motor between the transmission and the differential. In a P4 configuration, the electric motor directly drives the axles.

Of these configurations the P2 configuration is considered very versatile in that it allows hybrid technology to be incorporated in to existing combustion engine powertrains with minimal modification to the existing powertrain.

SUMMARY

In view of the above, the present invention provides an assembly for power transmission between an output of a drive engine and an input of a transmission.

In one aspect, the invention provides an assembly for power transmission between an output of a drive engine and an input of a transmission that includes a torque converter having an input member, an output member and a hydrodynamic circuit coupling the input member to the output member, the torque converter defining a central axis; a P2 module, the P2 module including a clutch and an electric motor, with the clutch having an input member configured to connect to the output of the drive engine, the clutch having an engaged position and a disengaged position, in the engaged position the input member being connected to the torque converter, in the disengaged position the input member being disengaged from the torque converter; and with the electric motor having a stator and a rotor, the electric motor being coupled to the clutch and being drivingly coupled to the torque converter via a splined engagement.

In another aspect, the torque converter includes a shell having a first set of splines provided therewith, and wherein the rotor includes a second set of splines provided therewith, the first set of splines being engaged with second the splines of the rotor and forming the splined engagement.

In a further aspect, the torque converter includes a shell having splines formed thereon.

In an additional aspect, the splines protrude radially outward and extend axially.

In yet another aspect, the shell includes a circumferential surface, the circumferential surface being coaxial with the central axis and the splines being located on the circumferential surface.

In still a further aspect, the splines are unitary with the shell.

In an additional aspect, the splines are integral with the shell.

In another aspect, the clutch includes interleaved friction plates, a first set of the friction plates being rotationally fixed to an outer support plate and a second set of the friction plates being rotationally fixed to an inner support plate.

In a further aspect, the rotor is supported on the outer support plate.

In an additional aspect, the torque converter includes a shell having splines formed thereon, and wherein the outer support plate includes splines formed thereon, the splines of the torque converter being engaged with the splines of the outer support plate and forming the splined engagement.

In yet another aspect, the splines on the outer support plate are engaged with the first set of friction plates and rotationally fix the first set of friction plates to the outer support plate.

In still a further aspect, the torque converter includes a shell, a ring connected to the shell and defining a circumferential surface, a first set of splines provided on the circumferential surface, and wherein the rotor includes a second set of splines provided therewith, the first set of splines being engaged with the second set of splines and forming the splined engagement.

In an additional aspect, a pilot hub having a central bore, the pilot hub being coaxial with the central axis and received within the input member of the clutch, the torque converter including a mounting hub axially received within the bore of the pilot hub and axially retained therein by a retention feature configured to facilitate axial insertion of the mounting hub into the pilot hub.

In another aspect, the retention feature includes a snap ring radially received within a groove formed in the mounting hub, the snap ring being radially compressible.

In a further aspect, the axial engagement further includes a groove formed in the bore of the pilot hub, the snap ring configured to radially expand into the groove of the pilot hub upon full seating of the torque converter with the P2 module.

In an additional aspect, an angled trailing surface on the snap ring and a corresponding angled trailing surface on the groove of the pilot hub.

In yet a further aspect, the retention feature further includes a chamfer, the chamfer being provided about the bore on an entrance end of the bore.

In another aspect of the invention, an assembly for power transmission between an output of a drive engine and an input of a transmission is provide and includes a torque converter having an input member, an output member and a hydrodynamic circuit coupling the input member to the output member, the torque converter defining a central axis; a P2 module, the P2 module having a clutch and an electric motor, with the clutch having an input member configured to connect to the output of the drive engine, the clutch having an engaged position and a disengaged position, in the engaged position the input member being connected to the torque converter, in the disengaged position the input member being disengaged from the torque converter; and with the electric motor having a stator and a rotor, the electric motor being coupled to the clutch and being drivingly coupled to the torque converter; and where the P2 module further includes a pilot hub having a central bore coaxial with the central axis and received within the input member of the clutch, the torque converter including a mounting hub axially received within the bore of the pilot hub and axially retained therein by a retention feature configured to facilitate axial insertion of the mounting hub into the pilot hub.

In another aspect, the retention feature includes a snap ring radially received within a groove formed in the mounting hub, the snap ring being radially compressible.

In a further aspect, the axial engagement further includes a groove formed in the bore of the pilot hub, the snap ring configured to radially expand into the groove of the pilot hub upon full seating of the torque converter with the P2 module.

In an additional aspect, an angled trailing surface is provided on the snap ring and a corresponding angled trailing surface on the groove of the pilot hub.

In yet another aspect, the retention feature further includes a chamfer, the chamfer being provided about the bore on an entrance end of the bore.

In still a further aspect, the electric motor is drivingly coupled to the torque converter via a splined engagement.

In an additional aspect, the torque converter includes a shell having a first set of splines provided therewith, and wherein the rotor includes a second set of splines provided therewith, the first set of splines being engaged with second the splines of the rotor and forming the splined engagement.

In a further aspect, the torque converter includes a shell having splines formed thereon.

In an additional aspect, the splines protrude radially outward and extend axially.

In still another aspect, the shell includes a circumferential surface, the circumferential surface being coaxial with the central axis and the splines being located on the circumferential surface.

In yet a further aspect, the splines are unitary with the shell.

In an additional aspect, the splines are integral with the shell.

In another aspect, the clutch includes interleaved friction plates, a first set of the friction plates being rotationally fixed to an outer support plate and a second set of the friction plates being rotationally fixed to an inner support plate.

In a further aspect, the rotor is supported on the outer support plate.

In an additional aspect, the torque converter includes a shell having splines formed thereon, and wherein the outer support plate includes splines formed thereon, the splines of the torque converter being engaged with the splines of the outer support plate and forming the splined engagement.

In still another aspect, the splines on the outer support plate are engaged with the first set of friction plates and rotationally fix the first set of friction plates to the outer support plate.

In yet a further aspect, the torque converter includes a shell, a ring connected to the shell and defining a circumferential surface, a first set of splines provided on the circumferential surface, and wherein the rotor includes a second set of splines provided therewith, the first set of splines being engaged with the second set of splines and forming the splined engagement.

In another aspect, the invention provides an assembly for power transmission between an output of a drive engine and an input of a transmission, the assembly comprising a torque converter having an input member, an output member and a hydrodynamic circuit coupling the input member to the output member, the torque converter defining a central axis; a P2 module, the P2 module including a clutch and an electric motor, with the clutch having an input member configured to connect to the output of the drive engine, the clutch having an engaged position and a disengaged position, in the engaged position the input member being connected to the torque converter, in the disengaged position the input member being disengaged from the torque converter, and the clutch including interleaved friction plates, a first set of the friction plates being rotationally fixed to an outer support plate and a second set of the friction plates being rotationally fixed to an inner support plate; and with the electric motor having a stator and a rotor, the electric motor being coupled to the clutch and being drivingly coupled to the torque converter; and the torque converter further comprising a shell, wherein said shell of said torque converter is axially retained within said outer support plate by a retention feature configured to facilitate axial insertion of said shell into said outer support plate.

In a further aspect, the retention feature includes a snap ring radially received within a groove formed in said shell of said torque converter, said snap ring being radially compressible.

In an additional aspect, the electric motor is drivingly coupled to the torque converter via a splined engagement, and wherein said shell defines a circumferential surface having a first set of splines provided on the circumferential surface, with the rotor including a second set of splines provided therewith, and with the first set of splines being engaged with the second set of splines and forming the splined engagement.

Further objects, features and advantages of this invention will become readily apparent to persons skilled in the art after review of the following description, including the claims, and with reference to the drawings that are appended to and form a part of this specification.

DETAILED DESCRIPTION

As used in the description that follows, directional terms such as "upper" and "lower" are used with reference to the orientation of the elements as presented in the figures. Accordingly, "upper" indicates a direction toward the top of the figure and "lower" indicates a direction toward the bottom of the figure. The terms "left" and "right" are similarly interpreted. The terms "inward" or "inner" and "outward" or "outer" indicate a direction that is generally toward or away from a central axis of the referred to part whether or not such an axis is designated in the figures. An axial surface is therefore one that faces in the axial direction along the axis. A radial surface therefore faces radially, generally away from or toward the central axis. It will be understood that in actual implementation, the directional references used herein may not necessarily correspond with the installation and orientation of the corresponding components or device.

Figure 1:
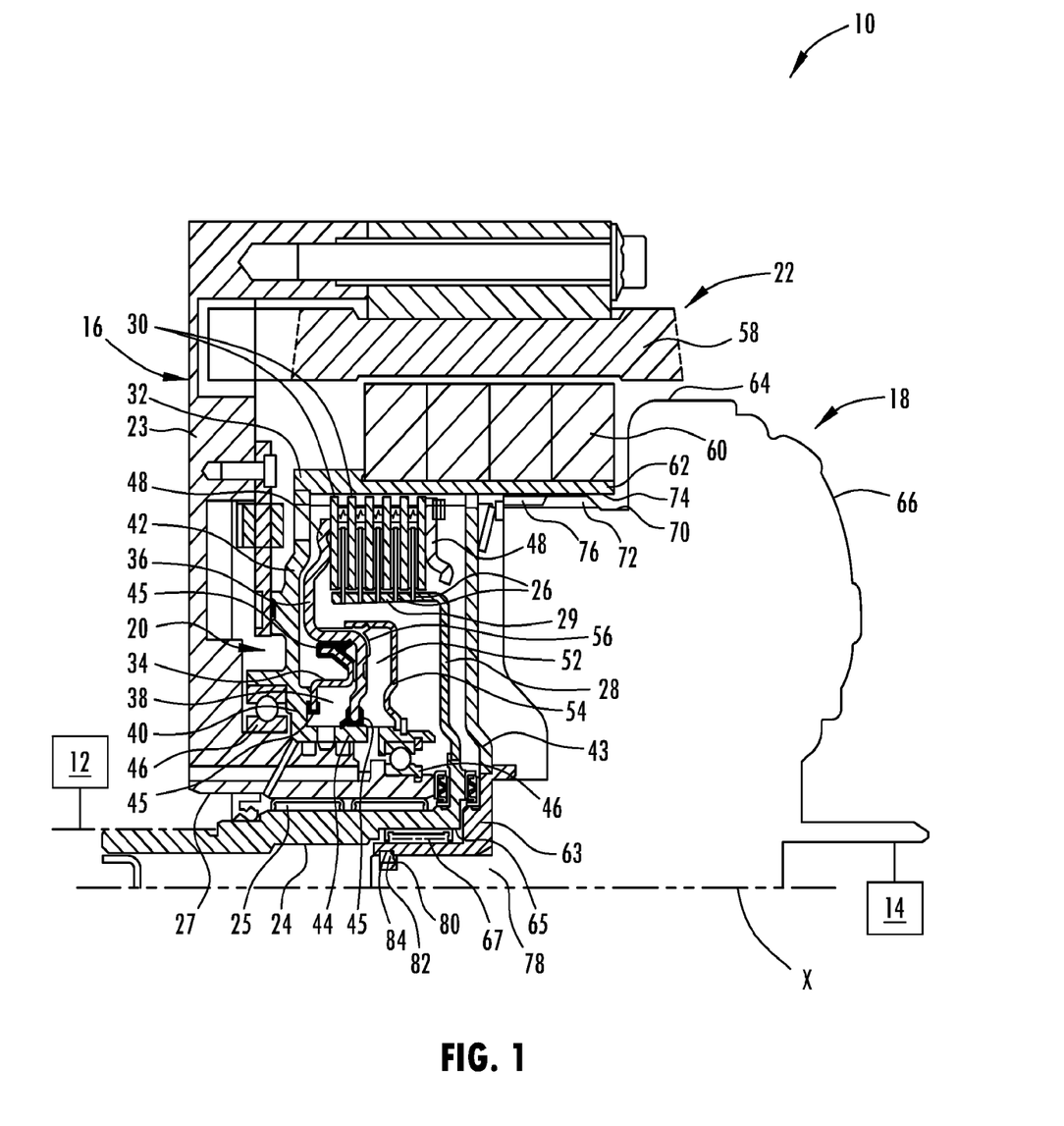
FIG. 1 is a schematic cross-sectional view of an integrated torque converter and P2 module assembly incorporating the principles of the present invention.

Referring now to FIG. 1, a device, an integrated torque converter and P2 module, embodying the principles of the present invention is generally illustrated therein and designated at 10. The device 10 is positioned between the combustion engine 12 and the transmission 14 of a motor vehicle, which may be an automotive vehicle. As illustrated in FIG. 1, the engine 12 and transmission 14 are not illustrated in detail. Rather, the engine 12 and transmission 14 are shown coupled to the respective rotary input and output components of the device 10, which are configured to rotate about central axis X.

The device 10 includes as it principal components a P2 module 16 and a torque converter 18. The P2 module 16 further includes as its primary components a disconnect clutch 20 and an electric motor 22, both of which are supported within a housing 23 that is rigidly mounted to the engine 12 or other fixed structure of the vehicle.

The output of the combustion engine 12 is typically transferred by a crankshaft (not shown) to a damper system to attenuate torsional vibrations from the engine 12. In one embodiment, the damper system may be a dual mass flywheel damper. The output of the damper system is connected to an input member 24 of the P2 module 16, which is rotationally supported by bushings or bearings 25 within an axial bore 27 provided in the housing 23. While the damper system is mentioned as incorporating a flywheel, it will be appreciated that the damper system may alternatively incorporate other vibration damping mechanisms, such as a flex plate, without departing from the scope of the present disclosure.

As illustrated, the disconnect clutch 20 of the P2 module 16 is a hydraulic or wet clutch and is used to disconnect the combustion engine 12 from the torque converter 18 to allow the torque converter 18 to be driven exclusively by the electric motor 22. Such clutches are well known and generally includes a series of engine side (ES) friction plates 26 (two of which are called out in FIG. 1) that are connected to the input member 24 by a support plate 28, the latter of which rotates with the input member 24. The ES friction plates 26 are mounted to the support plate 28 so as to be rotationally fixed (and therefore rotate with) to the support plate 28, but supported to be moveable along an axial portion 29 of the support plate 28.

The ES friction plates 26 are interleaved with a series of transmission side (TS) friction plates 30 carried on a support plate 32 so as to also be rotationally fixed to the support plate 32, but axially moveable there along. Support plate 32 is rotationally supported in the housing 23 by a support member 42 of the clutch 20 and a pilot plate 43, both of which are further discussed below.

Defined within the clutch 20, between forward chamber plate 34 and a piston plate 36, is an engagement chamber 38. The front chamber plate 34 is rigidly mounted to a radial wall 40 of the support member 42, while the piston plate 36 is supported on an axial hub 44 of the support member 42 in a manner that permits axial movement of the piston plate 36 along the hub 44. Seals 45 are provided at the various interfaces between the forward chamber plate 34, the piston plate 36 and support member 42. The support member 42 itself is rotationally supported by bearings 46 within the housing 23.

During operation of the disconnect clutch 20, hydraulic fluid is provided to the engagement chamber 38 from a pressurized oil circuit. The pressurized oil circuit can be supplied by the transmission or separate oil pump. As pressure in the engagement chamber 38 increases, the piston plate 36 is axially moved along the hub 44, in the direction of the torque converter 18, causing an active end 48 of the piston plate 36 to engage the interleaved TS and ES friction plates 30, 26. Opposite of the active end 48, on an opposing side of the interleaved TS and ES friction plates 30, 26, a reaction plate 50 is rotationally and axially fixed to the support plate 32. The force applied by the piston plate 36 and caused by the pressure in the engagement chamber 38 compresses the ES and TS friction plates 26, 30 against one another and between the active end 48 and the reaction plate 50, thereby engaging the clutch 20 and causing the support plate 32 to be rotationally locked with the input member 24 and crankshaft of the engine 12. As will be appreciated, friction material may be provided on and between engaging surfaces of the ES and TS friction plates 26, 30, as well as the active end 48 and reaction plate 50.

To cause disengagement of the clutch 20, a disengagement chamber 52 is defined within the clutch 20. To define the disengagement chamber 52, a rear chamber plate 54 is fixedly supported on the hub 44 at a location spaced from the piston plate 36 and is configured to sealingly engage the piston plate 36. A seal 56 may be provide one of the piston plate 36 and rear chamber plate 54 to provide for the sealed engagement. Since the disengagement chamber 52 is defined on an opposite side of the piston plate 36 from the engagement chamber 38, when hydraulic fluid is provided to the disengagement chamber 52 and not to the engagement chamber 36, the increased pressure in the disengagement chamber 52 will cause axial movement of the piston plate 36 away from the torque converter 18. This movement releases the frictional engagement of the ES and TS friction plates 26, 30 and permits relative rotation between the plates 26, 30 and therefore the support plates 28, 32.

Referring now to the electric motor 22, the motor 22 is positioned radially outward of the disconnect clutch 20 and includes a stator 58 and rotor 60. The stator 58 is stationarity mounted to the housing 23 of the P2 module 16, while the rotor 60 is mounted to the support plate 32, with a portion of the support plate 32 thereby forming an inner base or portion 62 of the rotor 60. Being mounted to the support plate 32, the rotor 60 is also rotatably supported by the support member 42 and the pilot plate 43. Accordingly, when the clutch 20 is disengaged and the electric motor 22 is operated, the induced magnetic flux will cause the rotor 60, and therefore the support plate 32, to rotate. This rotation of the support plate 32 by the rotor 60 can be utilized in the present device 10 to provide rotary input to the torque converter 18.

The pilot plate 43 is mounted at its outer periphery to the support plate/rotor base 32, 62 of the rotor 60. At its inner periphery, the pilot plate 43 includes a pilot hub 63 that extends coaxially within the inner bore 65 of the input member 24. The pilot hub 63 is supported within the bore 65 by bushings or bearings 67.

As an alternative construction, the pilot plate 43 and hub 63 may be integrated into part of the stamping forming the torque converter front cover 64.

As further discussed below and seen in FIG. 2, the torque converter 18 includes a front cover 64 that is secured to a rear cover 66 by a weld, or other suitable means, to form a fluid tight chamber 68. The front cover 64 defines the engine side of the torque converter 18, while the rear cover 66 defines the transmission side of the torque converter 18.

To rotationally connect the torque converter 18 to the rotor 60, the front cover 64 of the torque converter 18 is formed with a circumferential surface 70. Preferably, the circumferential surface 70 is radially facing and coaxial with the central axis X. Provided on the circumferential surface 70 are splines 72 protruding radially outward and extending axially. Correspondingly, the inner face 74 of the rotor's base 62 is provided with splines 76, protruding radially inward and axially, that form a mated splined engagement with the splines 72 of the torque converter's front cover 64. The splines 72, 76 allow the torque converter 18 to be axially mounted and engaged with the P2 module 16 and the electric motor 22.

The splines 72 of the torque converter 18 may be provided on or formed in the front cover 64. As such, the splines 72 may be one-piece (unitary) with the front cover 64 or may be integrally mounted to the front cover 64. The splines 76 of the rotor 60 may be provided on or formed in the base 62 of the rotor 60. As such, the splines 76 may be one-piece (unitary) with the rotor base 62 or may be integrally mounted to the rotor base 62 or support plate 32.

The splines 76 of the rotor base 62 may extend substantially the length of the support plate 32. Extending the substantially the length of the support plate 32, the splines 76 may additionally engage corresponding notches in the friction plates 30 so as rotationally fix the friction plates relative to the support plate 32 as mentioned above.

Figure 4:
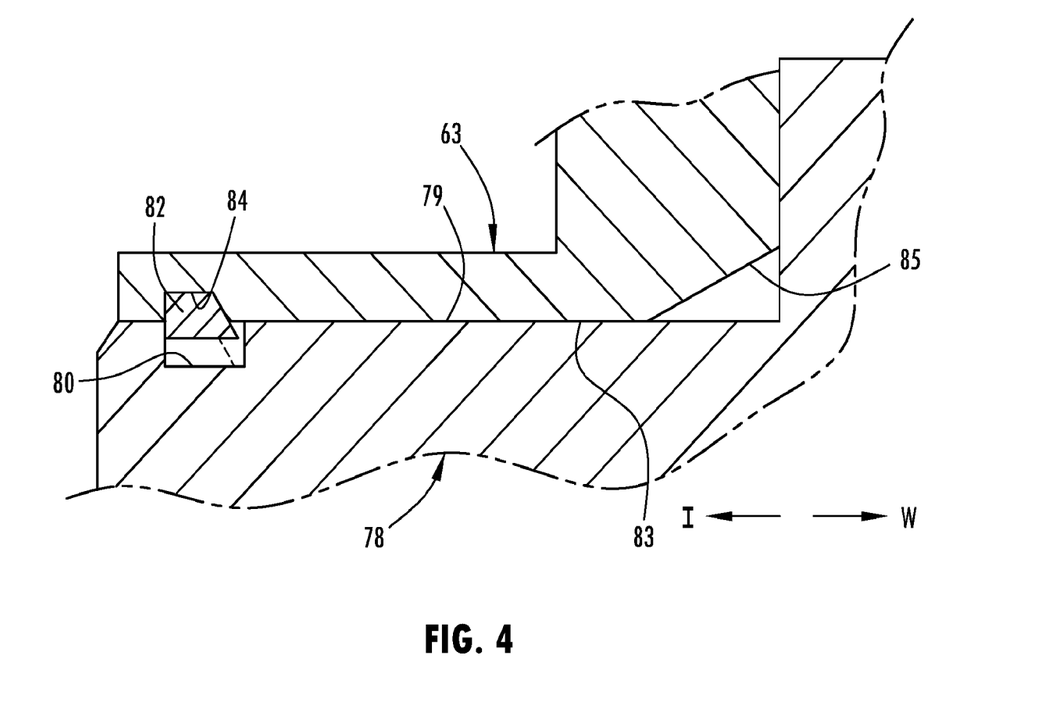
FIG. 4 is an enlarged view of the axial retention feature of the integrated torque converter and P2 module assembly.

To axially retain the torque converter 18 with the P2 module 16, the central portion of the torque converter's front cover 64 is provided with a mounting hub 78. The mounting hub 78 is piloted into engagement with the P2 module 16 via the pilot hub 63 of the pilot plate 43. As seen in FIG. 4, the mounting hub 78 includes a groove 80, formed in an outer circumferential surface 79, for receiving a snap ring 82. A chamfer 81 is provided on the distal end of the mounting hub 78 so that upon insertion of the mounting hub 78 into a central bore 83 of the pilot hub 63, generally in the direction I, the chamfer 81 will engage a chamfer 85 on the entrance end of the bore 83 and pilot the mounting hub 78 into the bore 83. As the mounting hub 78 progresses into the bore 83, the snap ring 82 will also engage the chamfer 85 causing the snap ring 82 to be radially compressed fully into the groove 80. The snap ring 82 will remain fully compress in the groove 80 until the mounting hub 78 is fully seated in the pilot hub 63 and the torque converter 18 fully seated with respect to the P2 module 16. When fully seated, the snap ring 82 will be opposed to a groove 84 formed in the bore 83 and will radially expands into the groove 84, whereupon the snap ring 82 axially retains the torque converter 18 with the P2 module 16. Should the torque converter 18 need to be withdrawn from the P2 module 16 for service of either component, the snap ring 82 and groove 84 are each provided with angled trailing surfaces 87, 89. Upon exertion of sufficient force in direction W, the surfaces 87, 89 will slip relative to one another causing the snap ring 82 to be compressed into the groove 80, thereby allowing removal of the torque converter 18 from the P2 module 16.

Figure 2:
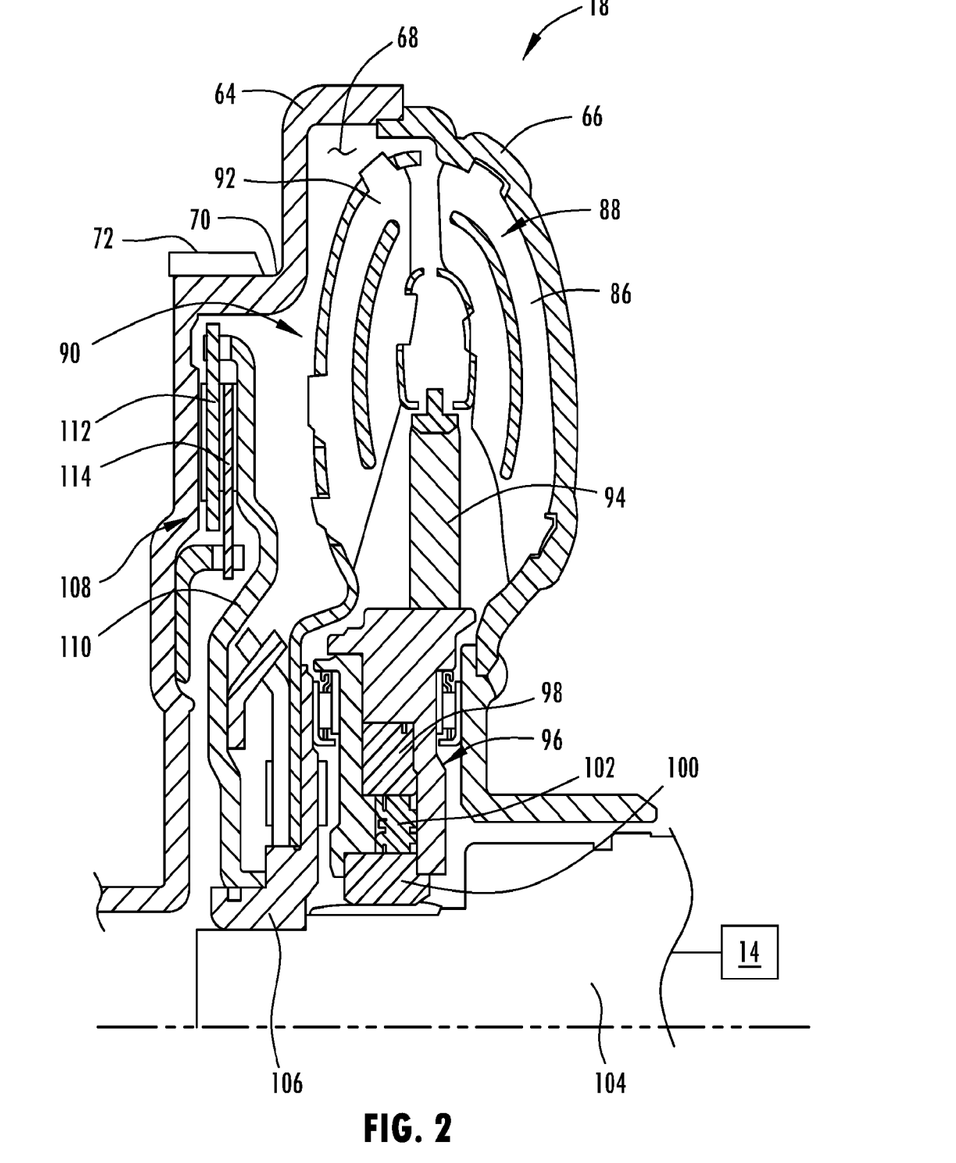
FIG. 2 is schematic cross-sectional view of the torque converter seen in FIG. 1.

Referring now to FIG. 2, internally of the torque converter's rear cover 66 is provided with a series of blades or vanes 86 so as to form an impeller 88. During rotation of the rear cover 66, hydraulic fluid is supplied from the automatic transmission and is forced radially outwardly under the centrifugal force generated by the rotating impeller blades 86. The impeller blades 86 also directs the hydraulic fluid forward, in a direction away from the rear cover 66. In FIG. 2, outward motion of the hydraulic fluid is toward the top of the figure and forward motion of fluid is toward the left of the figure.

Immediately forward of the impeller 88, the torque converter 18 includes a turbine 90. The turbine 90 is also formed with a series of blades 92. The turbine blades 92 are oriented to receive the hydraulic fluid from the impeller blades 86. The force of the fluid received from the impeller 88, as well as the shape of the turbine blades 92 themselves, rotationally drives the turbine 90 in the same direction as the rotational direction of the impeller 88. The hydraulic fluid received by the turbine 90 is in turn re-directed inward and rearward, back to the impeller 88.

Positioned between the impeller 88 and the turbine 90 is a stator 94. The stator 94 receives the hydraulic fluid being returned from the turbine 90 to the impeller 88. The stator 94 intercepts the fluid from the turbine 90 and redirects the fluid so that its rotational direction is aligned with the rotational direction of the impeller 88. This redirection is conducted in such a manner that the returned hydraulic fluid is efficiently received by the impeller 88 in a manner that does not impede rotation of the impeller 88, but that instead augments rotation allowing for a multiplication of the torque passing through the torque converter 18. With the inclusion of the above fluid coupling, rotation from the engine 12 is transferred as rotation to the transmission 14 of the vehicle.

Integrated with the stator 94 is a one-way clutch assembly 96 that limits rotation of the stator 94 to a single direction and improves torque transfer efficiency. The one-way clutch assembly 96 includes an outer race 98 upon which the stator 94 is mounted. The one-way clutch assembly 96 also includes an inner race 100 and roller elements 102, the latter of which are located between the outer and inner races 98, 100. The inner race 100 of the one-way clutch assembly 96 is mounted upon a fixed, nonrotating support shaft (not defined in the figure) associated with the input shaft 104 of the transmission 14. In the interest of brevity, and since one-way clutch assemblies of this type are well known in the field of the present invention, those skilled in the art will really appreciate the construction and operation of the one-way clutch assembly 96. As such, the one-way clutch assembly 96 is not and need not be explained in greater detail.

The turbine 90 is supported by an output hub 106, which is mounted on the input shaft 104 of the transmission 14.

Adjacent the front cover 64 a lock-up clutch assembly 108 is provided. When engaged, the lock-up clutch assembly 108 locks rotation of the front cover 64 with the output hub 106 and the input shaft 104 of the transmission 14, generally bypassing the fluid coupling between the impeller 88 and the turbine 90. The lock-up clutch assembly 108 includes a clutch piston 110 radially supported by the output hub 106. A friction plate 112 may be supported by the clutch piston 110 to engage an inner surface of the front cover 64 and a friction plate 114 supported thereby, in the lock-up condition.

Forward of the turbine 90, generally in a position between the turbine 90 and the lock up clutch assembly 108, the torque converter 18 may include a damper (not shown), which operates to further absorb variations in the rotation speed of the output from the engine 12. Dampers of this general type are well known in the field of the present invention and those skilled in the art will really appreciate the possible constructions, variation and operations of such a damper. Accordingly, the damper is not be explained in further detail herein.

Figure 3:
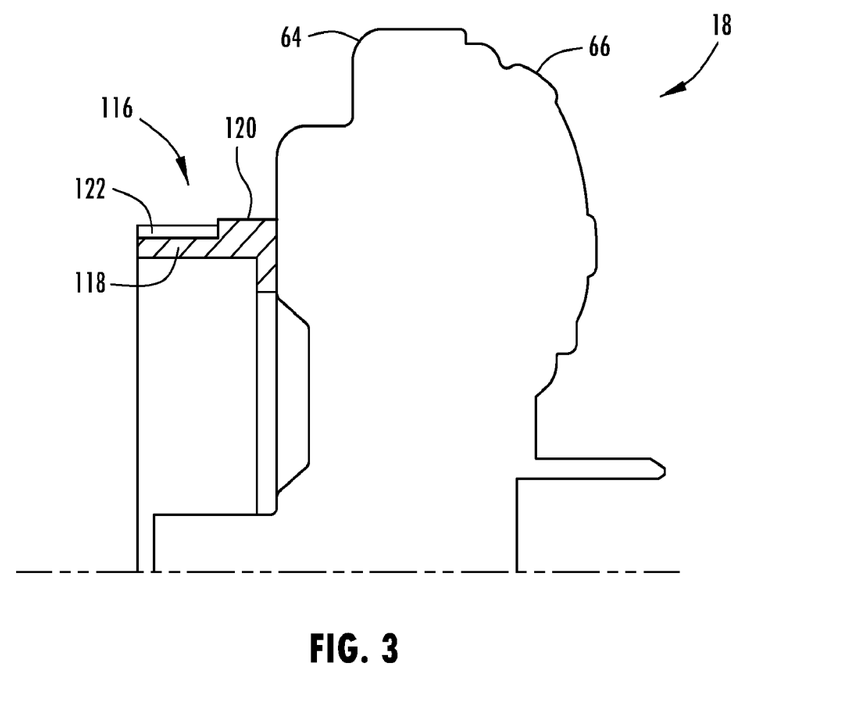
FIG. 3 is a schematic illustration of an alternative embodiment and shows an alternative location for the splined engagement.

Referring now to FIG. 3, an alternative construction for rotationally connecting the P2 module 16 to the torque converter 18 is schematically illustrated therein. In this construction, a carrier plate 116 is mounted to the front cover 64 of the torque converter 18 by welding, mechanical fasteners or other means. The carrier plate 116, which is shown in cross-section for clarity, includes a ring 118 extending axially from the front cover 64. The ring 118 further includes an outer circumferential surface 120 upon which are provided splines 122. The splines 122 are provided so as to matingly engage the splines 76 provided on the support plate 32 and inner base 62 of the rotor 60, as discussed above. The carrier plate 116, including the ring 118 and splines 122 may be formed by various means, including fabrication or stamping.

With the above construction, the electric motor 22 and disconnect clutch 20 are not affected by axial movement or forces resulting for ballooning of the torque converter's shell (front and rear covers 64, 66). Additionally, because of the wholly axial aspect of the assembling of the torque converter 18 with the P2 module 16, installation methods are flexible and allow the P2 module 16 to be provide and shipped as an assembly or as separate subsystems for later assembly at the time of assembly with the torque converter 18.

Figure 5:
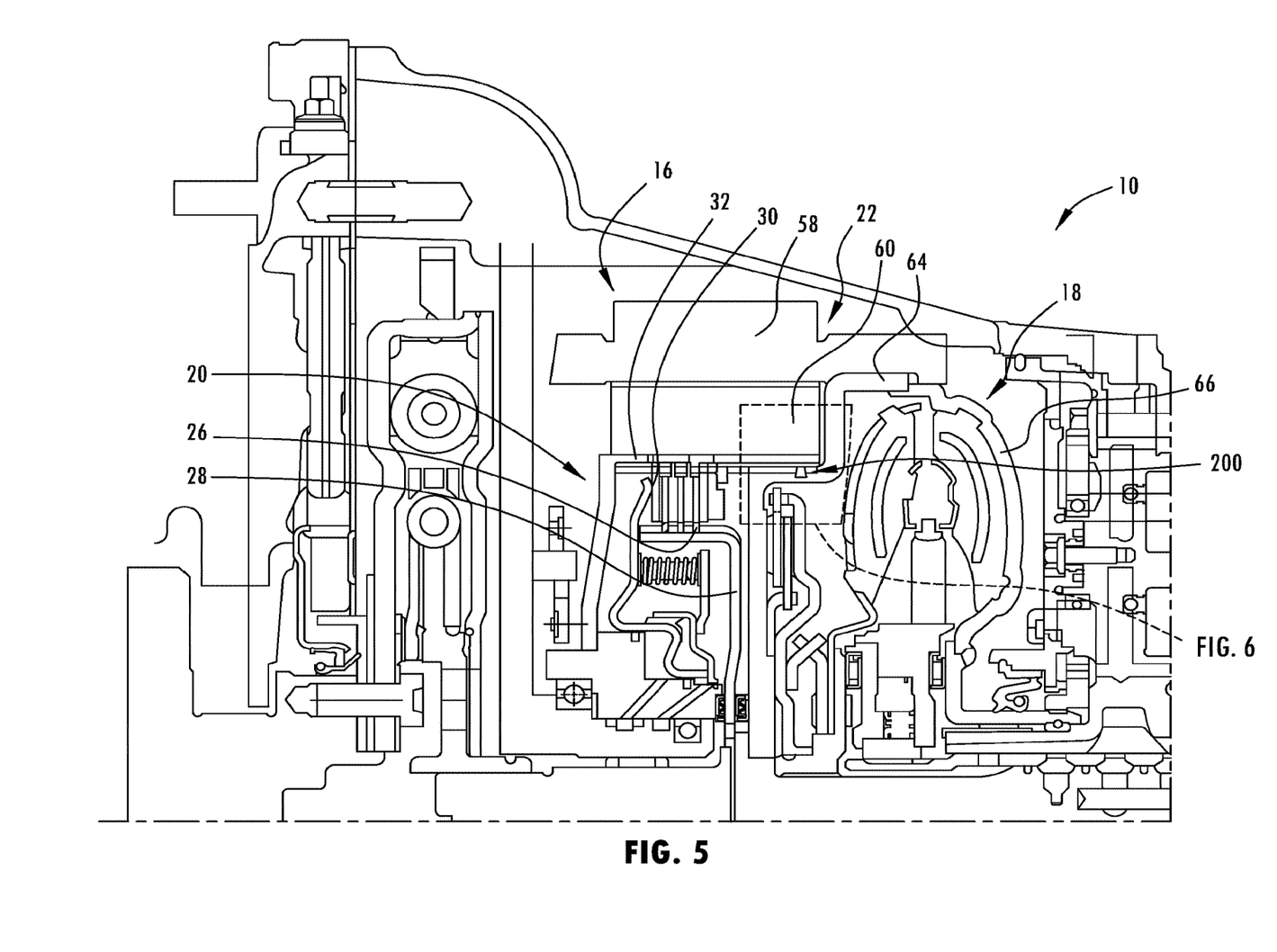
FIG. 5 is a schematic illustration of an alternative embodiment of the axial retention feature.
Figure 6:
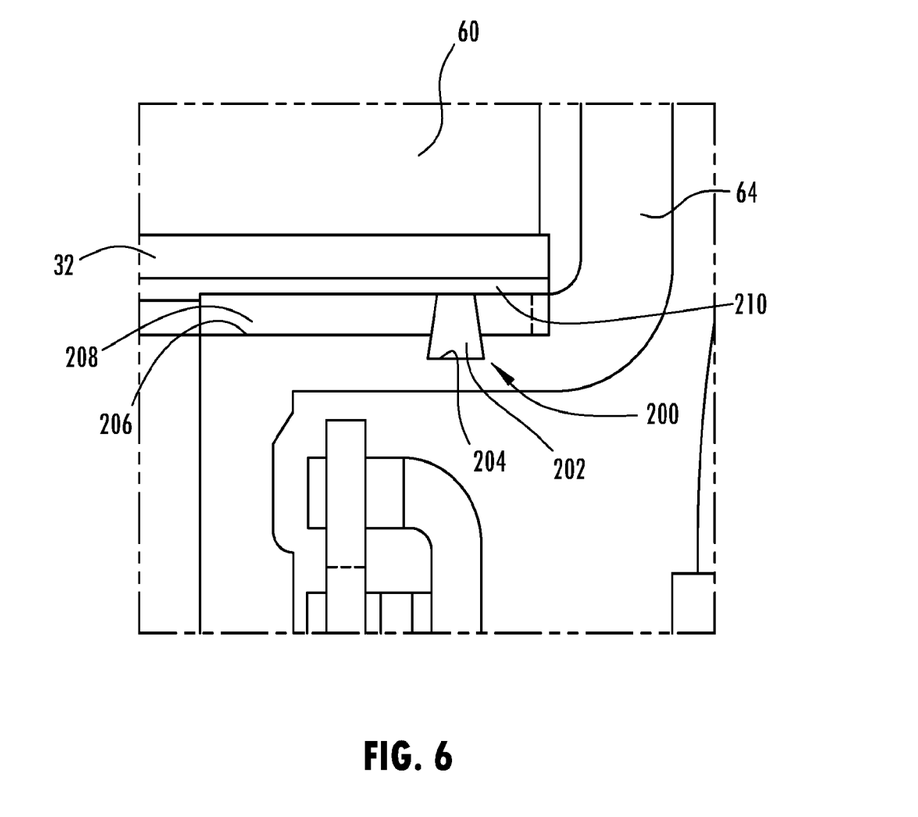
FIG. 6 is an enlarged view of the axial retention feature seen in FIG. 5.

With reference to FIGS. 5 and 6, the torque converter 18 has the input member, the output member and the hydrodynamic circuit coupling the input member to the output member. The torque converter 18 defines a central axis X. The P2 module 16 includes the clutch 20 and the electric motor 22. The clutch 20 has the input member configured to connect to the output of the engine 12. The clutch 20 has an engaged position and a disengaged position. In the engaged position the input member is connected to the torque converter 18. In the disengaged position the input member is disengaged from the torque converter 18. The clutch 20 includes the interleaved friction plates, the first set of the friction plates 30 being rotationally fixed to the outer support plate 32 and the second set of the friction plates 26 being rotationally fixed to the inner support plate 28. The electric motor 22 has the stator 58 and the rotor 60, the electric motor 22 being coupled to the clutch 20 and being drivingly coupled to the torque converter 18.

As shown in FIGS. 5 and 6, the torque converter 18 further includes the shell 64, 66 (front cover 64 and rear cover 66). The shell 64, 66 of the torque converter 18 is axially retained within the outer support plate 32 by a retention feature 200. In one embodiment, the front cover 64 is axially retained within the outer support plate 32 by the retention feature 200. The retention feature 200 is configured to facilitate axial insertion of the shell 64, 66 into the outer support plate 32.

The retention feature 200 in FIGS. 5 and 6 may include a snap ring 202 radially received within a groove 204 formed in the shell 64, 66 of the torque converter 18, with the snap ring 202 being radially compressible.

The electric motor 22 may be drivingly coupled to the torque converter 18 via a splined engagement. The shell 64, 66 defines a circumferential surface 206 having a first set of splines 208 provided on the circumferential surface 206. The rotor 60 includes a second set of splines 210 provided therewith. The first set of splines 208 are engaged with the second set of splines 210 and form the splined engagement.

The above description is meant to be illustrative of at least one preferred implementation incorporating the principles of the invention. One skilled in the art will really appreciate that the invention is susceptible to modification, variation and change without departing from the true spirit and fair scope of the invention, as defined in the claims that follow. The terminology used herein is therefore intended to be understood in the nature of words of description and not words of limitation.

We claim:

1. An assembly for power transmission between an output of a drive engine and an input of a transmission, the assembly comprising:
   a torque converter having an input member, an output member and a hydrodynamic circuit. coupling the input member to the output member, the torque converter defining a central axis; a P2 module, the P2 module including a clutch and an electric motor,
   the clutch having an input member configured to connect to the output of the drive engine, the clutch having an engaged position and a disengaged position, in the engaged position the input member being connected to the torque converter, in the disengaged position the input member being disengaged from the torque converter; and
   the electric motor having a stator and a rotor, the electric motor being coupled to the clutch and being drivingly coupled to the torque converter via a splined engagement;
   wherein the torque converter includes a shell having an outer surface with a first set of splines provided on the outer surface, and wherein the rotor includes a second set of splines provided. therewith, the first set of splines being engaged with the second set of splines of the rotor and forming the splined engagement.

2. The assembly according to claim 1, wherein the clutch includes interleaved friction plates, a first set of the friction plates being rotationally fixed to an outer support plate and a second set of the friction plates being rotationally fixed to an inner support plate.

3. The assembly according to claim 2, wherein the rotor is supported on the outer support plate.

4. The assembly according to claim 1, further comprising a pilot hub having a central bore, the pilot hub being coaxial with the central axis and received within the input member of the clutch, the torque converter including a mounting hub axially received within the bore of the pilot hub and axially retained therein by a retention feature configured to facilitate axial insertion of the mounting hub into the pilot hub.

5. The assembly according to claim 4, wherein the retention feature includes a snap ring radially received within a groove formed in the mounting hub, the snap ring being radially compressible.

6. The assembly according to claim 5, wherein the retention feature further includes a groove formed in the bore of the pilot hub, the snap ring configured to radially expand into the groove of the pilot hub upon full seating of the torque converter with the P2 module.

7. An assembly for power transmission between an output of a drive engine and an input of a transmission, the assembly comprising:
- a torque converter having an input member, an output member and a hydrodynamic circuit coupling the input member to the output member, the torque converter defining a central axis;
- a P2 module, the P2 module including a clutch and an electric motor, the clutch having an input member configured to connect to the output of the drive engine, the clutch having an engaged position and a disengaged position, in the engaged position the input member being connected to the torque converter, in the disengaged position the input member being disengaged from the torque converter; and
- the electric motor having a stator and a rotor, the electric motor being coupled to the clutch and being drivingly coupled to the torque converter; and
- the P2 module further including a pilot hub having an inner pilot hub surface facing the central axis and defining a central bore coaxial with the central axis, with the pilot hub received within the input member of the clutch, the torque converter including a mounting hub having an outer mounting hub surface facing and slidable against the inner pilot hub surface when the mounting hub is axially received within the bore of the pilot hub and axially retained therein by a retention feature that is disposed between the inner pilot hub surface and the outer mounting hub surface and that is configured to facilitate axial insertion of the mounting hub into the pilot hub.

8. The assembly according to claim 7, wherein the retention feature includes a snap ring radially received within a groove formed in the mounting hub, the snap ring being radially compressible.

9. The assembly according to claim 8, wherein the retention feature further includes a groove formed in the bore of the pilot hub, the snap ring configured to radially expand into the groove of the pilot hub upon full seating of the torque converter with the P2 module.

10. The assembly according to claim 7, wherein the electric motor is drivingly coupled to the torque converter via a splined engagement.

11. The assembly according to claim 10, wherein the torque converter includes a shell having a first set of splines provided therewith, and wherein the rotor includes a second set of splines provided therewith, the first set of splines being engaged with second the splines of the rotor and forming the splined engagement.

12. The assembly according to claim 10, wherein the torque converter includes a shell having splines formed thereon.

13. The assembly according to claim 10, wherein the clutch includes interleaved friction plates, a first set of the friction plates being rotationally fixed to an outer support plate and a second set of the friction plates being rotationally fixed to an inner support plate.

14. The assembly according to claim 13, wherein the rotor is supported on the outer support plate.

15. The assembly according to claim 14, wherein the torque converter includes a shell having splines formed thereon, and wherein the outer support plate includes splines formed thereon, the splines of the torque converter being engaged with the splines of the outer support plate and forming the splined engagement.

16. The assembly according to claim 10, wherein the torque converter includes a shell, a ring connected to the shell and defining a circumferential surface, a first set of splines provided on the circumferential surface, and wherein the rotor includes a second set of splines provided therewith, the first set of splines being engaged with the second set of splines and forming the splined engagement.

17. An assembly for power transmission between an output of a drive engine and an input of a transmission, the assembly comprising:
- a torque converter having an input member, an output member and a hydrodynamic circuit coupling the input member to the output member, the torque converter defining a central axis;
- a P2 module, the P2 module including a clutch and an electric motor, the clutch having an input member configured to connect to the output of the drive engine, the clutch having an engaged position and a disengaged position, in the engaged position the input member being connected to the torque converter, in the disengaged position the input member being disengaged from the torque converter, and the clutch including interleaved friction plates, a first set of the friction plates being rotationally fixed to an outer support plate and a second set of the friction plates being rotationally fixed to an inner support plate; and
- the electric motor having a stator and a rotor, the electric motor being coupled to the clutch and being drivingly coupled to the torque converter; and
- the torque converter further comprising a shell;
- wherein the shell of the torque converter is axially retained within the outer support plate by a retention feature; and
- wherein the retention feature includes a snap ring radially received within a groove formed in the shell of the torque converter.

18. The assembly as set forth in claim 17, wherein the snap ring is radially compressible.

19. The assembly as set forth in claim 17, wherein the electric motor is drivingly coupled to the torque converter via a splined engagement, and wherein the shell defines a circumferential surface having a first set of splines provided on the circumferential surface, with the rotor including a second set of splines provided therewith, and with the first set of splines being engaged with the second set of splines and forming the splined engagement.

20. An assembly for power transmission between an output of a drive engine and an input of a transmission, the assembly comprising:
- a torque converter having an input member, an output member and a hydrodynamic circuit coupling the input member to the output member, the torque converter defining a central axis; a P2 module, the P2 module including a clutch and an electric motor,
- the clutch having an input member configured to connect to the output of the drive engine, the clutch having an engaged position and a disengaged position, in the engaged position the input member being connected to the torque converter, in the disengaged position the input member being disengaged from the torque converter; and the electric motor having a stator and a rotor, the electric motor being coupled to the clutch and being drivingly coupled to the torque converter; and the P2 module further including a pilot hub having a central bore coaxial with the central axis and received within the input member of the clutch, the torque converter including a mounting hub axially received within the bore of the pilot hub and axially retained therein by a retention feature;

wherein the electric motor is drivingly coupled to the torque converter via a splined engagement; and wherein the torque convener includes a shell having a first set, of splines provided therewith, and wherein the rotor includes a second set of splines provided therewith, the first set of splines being engaged with the second set of splines of the rotor and forming the splined engagement.

* * * * *